Figure 1:
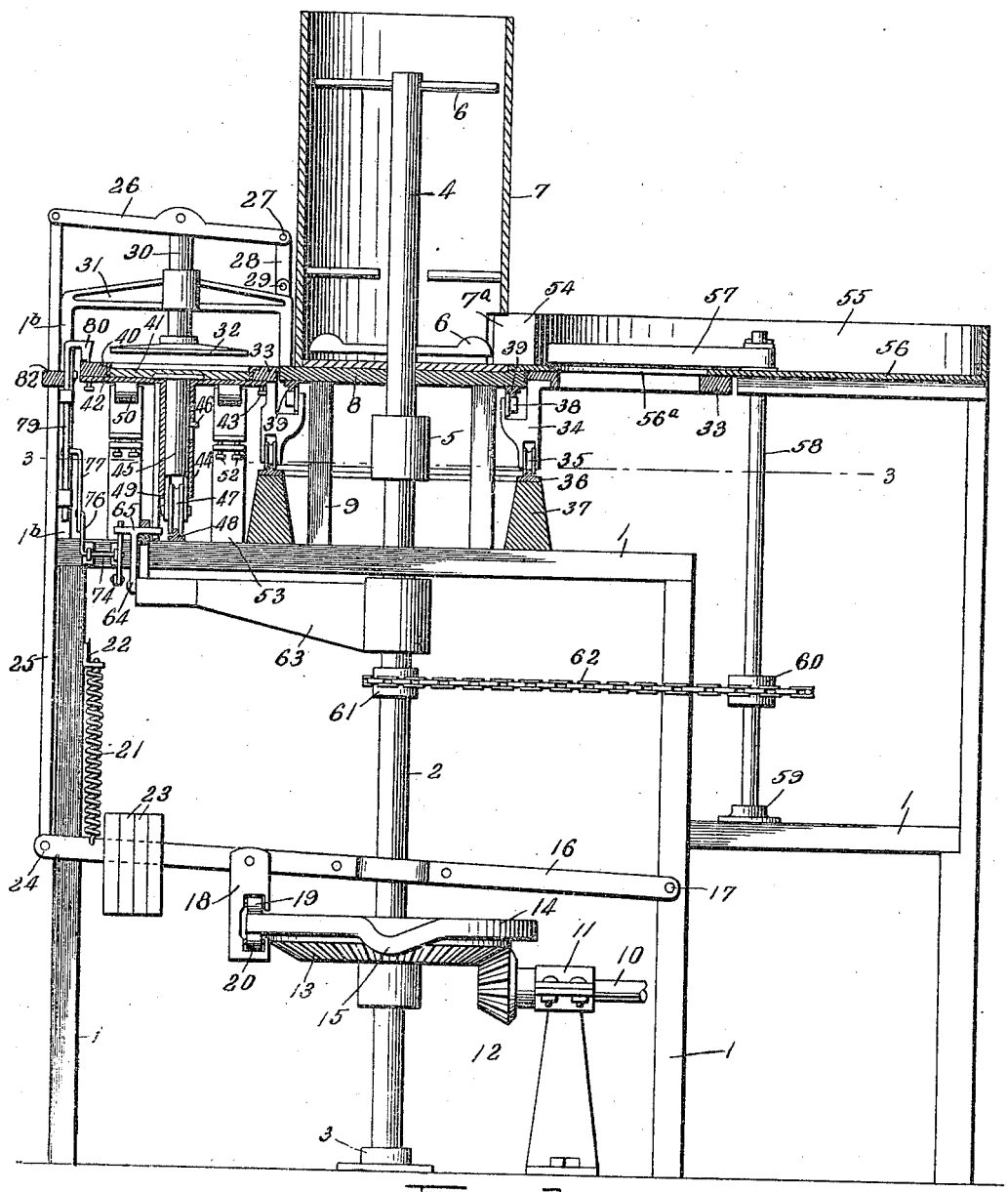

J. B. LEAMON.
MACHINE FOR MOLDING PLASTIC MATERIALS.
APPLICATION FILED APR. 2, 1909.

960,968.

Patented June 7, 1910.
5 SHEETS—SHEET 1.

J. B. LEAMON.
MACHINE FOR MOLDING PLASTIC MATERIALS.
APPLICATION FILED APR. 2, 1909.
960,968.
Patented June 7, 1910.
5 SHEETS—SHEET 2.
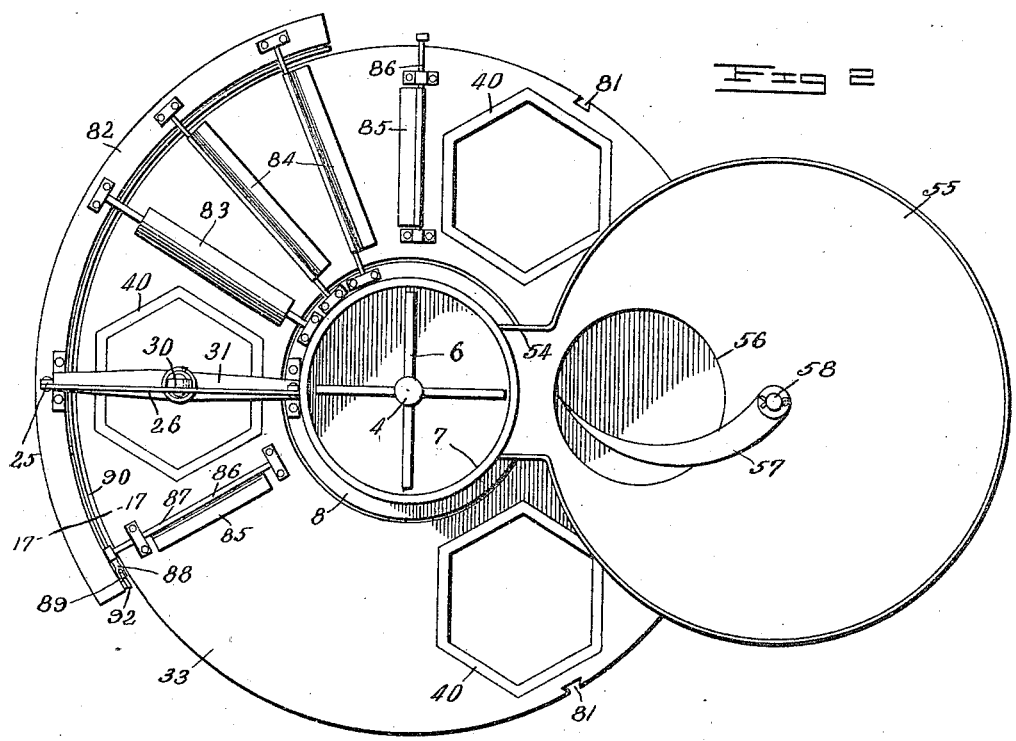
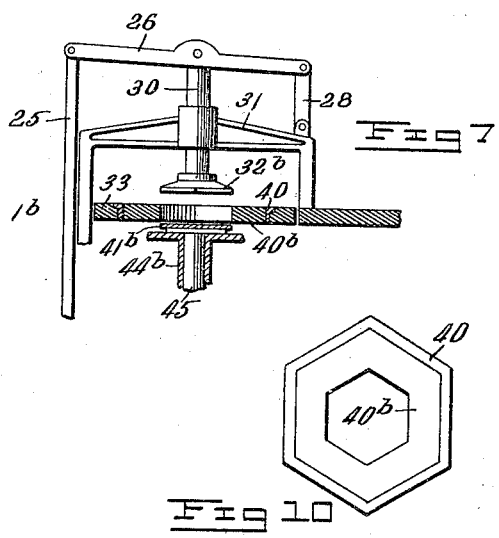
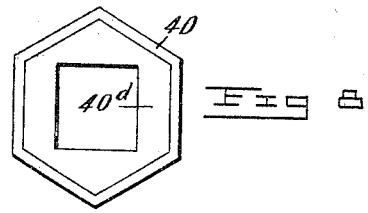
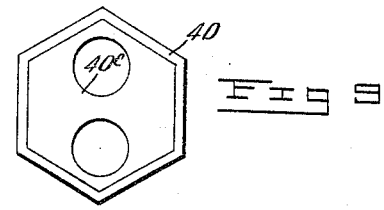
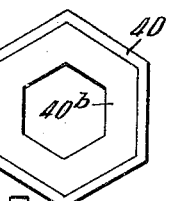
Witnesses
Inventor
John B Leamon
By G Howlett Davis
Attorney

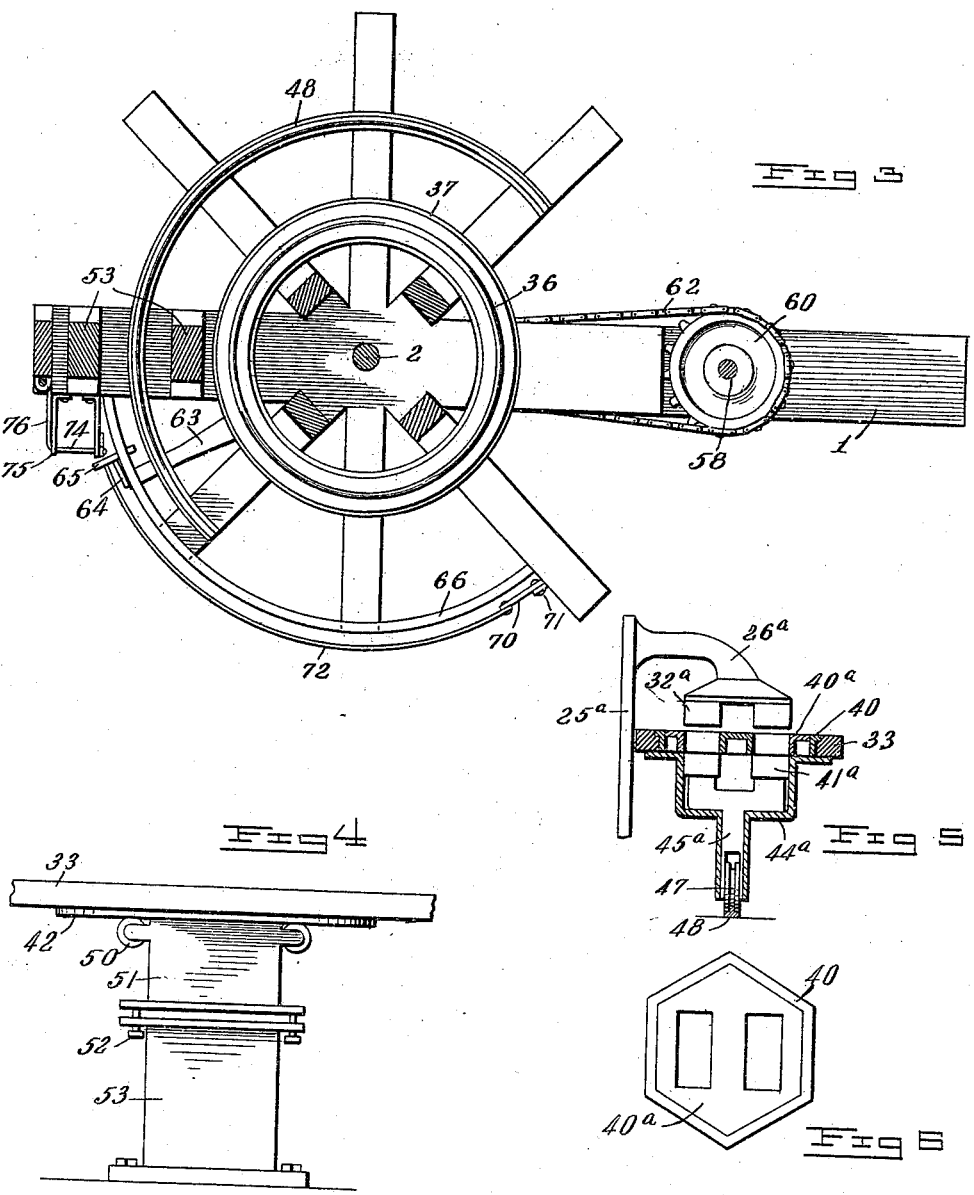

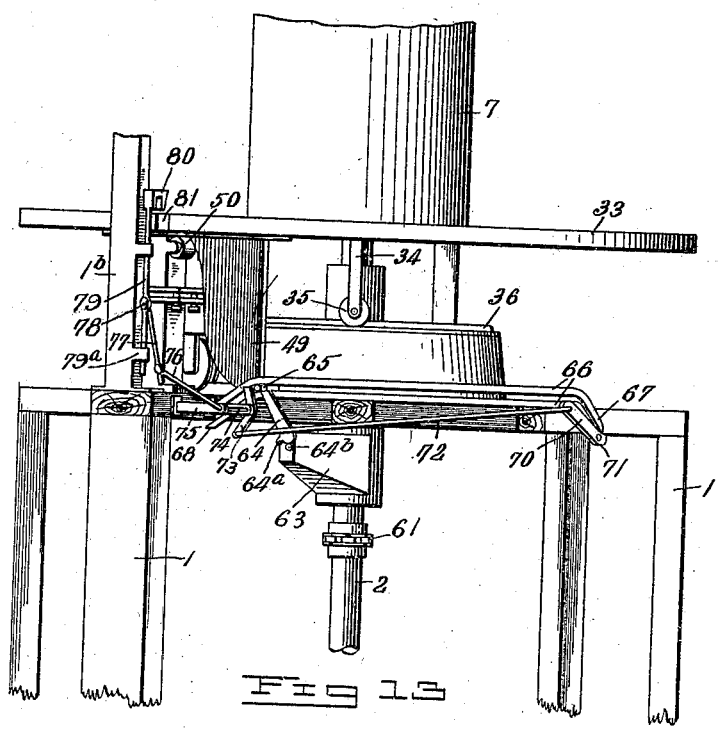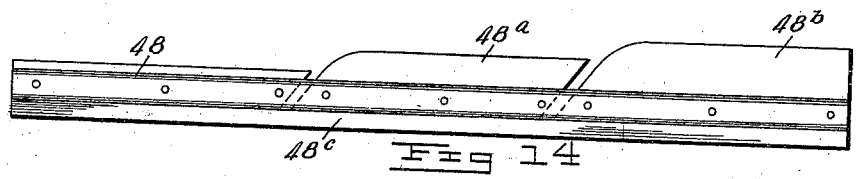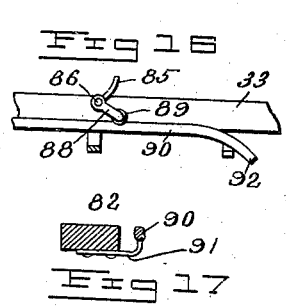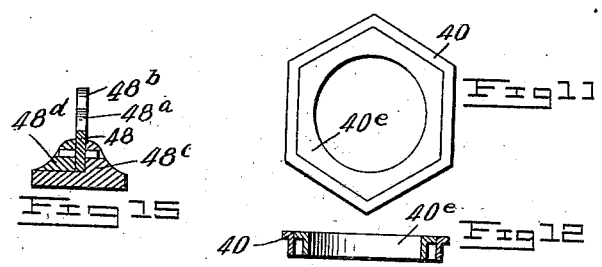

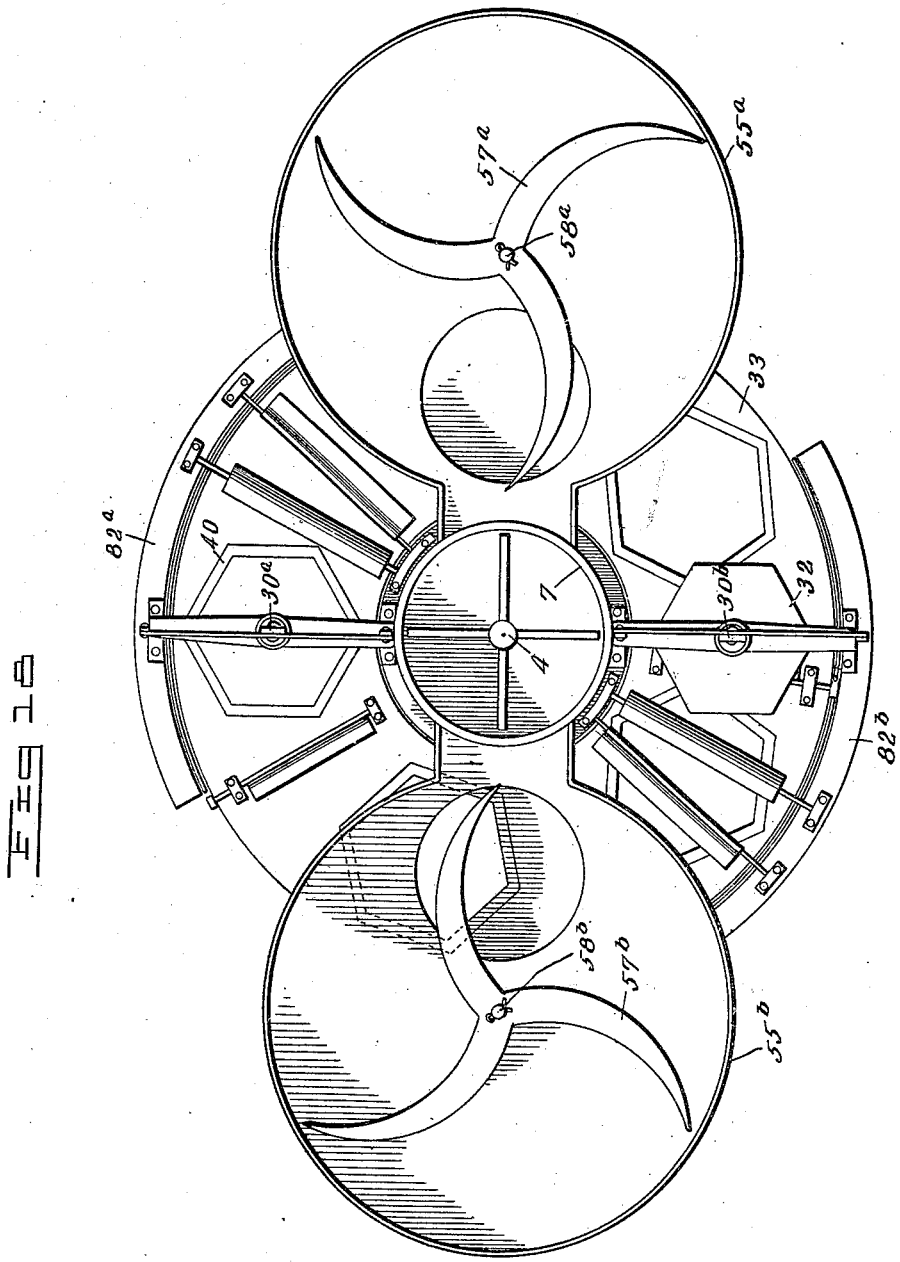

UNITED STATES PATENT OFFICE.

JOHN B. LEAMON, OF ATLANTA, GEORGIA.

MACHINE FOR MOLDING PLASTIC MATERIALS.

960,968.
Specification of Letters Patent.
Patented June 7, 1910.

Application filed April 2, 1909. Serial No. 487,544.

*To all whom it may concern:*

Be it known that I, JOHN B. LEAMON, citizen of the United States, residing at Atlanta, in the county of Fulton and State of Georgia, have invented certain new and useful Improvements in Machines for Molding Plastic Materials, of which the following is a specification.

My invention relates to machines for molding plastic material, and more particularly, to machines for making tile, brick, etc.

The object of the invention, generally considered, is to produce a continuously operating, power driven machine, which will serve to turn out the articles to be molded in a rapid and effective manner, and which may be employed, with equal facility, for forming articles of widely different size, shape, and material.

To this end, the invention comprises a rotating mold table, a plunger carrying a die, coöperating with said table, and means for operating said die and table and feeding the material to the molds.

More specifically, one object of the invention is to provide improved means for operating the die in several different ways.

A further object is to provide improved means for periodically moving the mold table or carrier, and for automatically locking the same in position after being moved.

A still further object of the invention is to provide efficient means for feeding the material to the molds, and for properly smoothing the top of the freshly molded articles.

With the above and other objects in view, and to improve generally upon the details of such machines, my invention consists in the construction, arrangement, and combination of parts hereinafter described, and illustrated in the accompanying drawings, in which:—

Figure 1 is a central vertical section through my complete machine, parts being shown in elevation. Fig. 2 is a plan view of the same. Fig. 3 is a sectional plan view, the section being taken substantially on the line 3—3 of Fig. 1. Fig. 4 is a side elevation on an enlarged scale of one of the mold supports shown in Fig. 1. Fig. 5 is a sectional view illustrating a modified form of press. Fig. 6 is a plan view of one form of mold. Fig. 7 is a sectional elevation illustrating another form of mold and a slightly modified die coöperating therewith. Figs. 8, 9, 10 and 11 are plan views illustrating various forms of mold. Fig. 12 is a transverse section of the mold shown in Fig. 11. Fig. 13 is a fragmentary perspective view illustrating details of the mold table operating and locking mechanism. Fig. 14 is a side elevation of a cam track hereinafter described. Fig. 15 is a transverse section thereof. Fig. 16 is a fragmentary side elevation of part of the mold table and scraper hereinafter described. Fig. 17 is a transverse section on an enlarged scale, such section being taken substantially on the line 17—17 of Fig. 2. Fig. 18 is a plan view of a complete machine illustrating a slightly modified arrangement.

Referring to the drawings in detail, the operating parts of my machine are supported on suitably arranged framework comprising struts and beams 1. Journaled in this framework is a vertically extending shaft 2, supported at its lower end by a thrust bearing 3. Connected to the upper end of this shaft by means of a detachable coupling 5, is a shaft 4, extending upwardly into the mill or mixer 7, and carrying arms or beaters 6 which serve to pulverize and mix the material in a well known manner. This mixer 7 rests upon a central platform 8, which in turn is supported by posts 9 rising from the framework 1, and the mixer and shaft 4, may be removed when desired.

Power for operating the machine is derived from a shaft 10 supported in bearings 11, which shaft may be driven by any suitable form of motor. The shaft 10 carries at its end a bevel gear 12, which meshes with a bevel gear 13 secured to the shaft 2. Formed integral with the gear 13 is a radially extending flange 14, crimped at one or more points in its periphery so as to form a cam 15, as clearly shown in Fig. 1.

Arranged above the gear 13 is a lever 16, pivoted at 17 to the frame 1, and having secured thereto near its other end a depending bracket 18, in which are mounted antifriction rollers 19 and 20. These rollers are spaced apart a distance approximately equal to the thickness of the flange 14 and are arranged to embrace such flange, one of said rollers lying above, and the other below the same. Also secured to the lever 16 near its free end is one end of a spring 21, the other end of which is secured to a bracket 22 fixed to the framework 1. Hung on the lever 16 between the spring 21 and the bracket 18 are a plurality of weights 23, the purpose of which will be hereinafter described.

Pivoted at 24 to the free end of the lever 16 is a vertically extending rod or bar 25, which in turn is pivoted at its upper end to one end of a lever 26, pivoted at 27 to one end of a link 28, the other end of which is pivoted at 29 to a fixed support. Pivoted to the center of the lever 26 is a plunger 30, which extends downwardly therefrom through a bearing in the cross-head 31, and carries at its lower end a die 32.

Surrounding the mixer 7 and lying in the same plane with the platform 8, is an annular mold table or carrier 33. This table is supported by means of brackets 34, in the lower ends of which are mounted rollers 35 which run upon a circular track 36, carried on a suitable support 37. The upper ends of said brackets also carry flanged rollers 38 which engage a second circular track 39, secured to the under side of the platform 8. By this means the brackets 34 are supported from both the top and bottom, and the mold table thus held rigidly and firmly.

Carried by the mold table are a number of suitably shaped molds 40. By reference to Fig. 2, it will be seen that for purposes of illustration three of said molds have been shown. It will, of course, be understood, however, that five or any other number may be equally well employed. These molds are preferably of hexagonal form, and are adapted to receive filler blocks or reducers as shown at $40^a$, $40^b$, $40^c$, $40^d$, and $40^e$, in Figs. 6 to 12, inclusive, in order to produce articles of different sizes or shapes.

As shown in Fig. 1, arranged in each of the molds 40, is a removable bottom 41, on which the material is molded, and this bottom is in turn supported by means of a plate 42 adjustably secured to the bottom of the mold table as by means of screws 43, so that articles of different thicknesses can be produced. Depending from the center of the plate 42 is a tubular extension 44, in which slides a plunger 45 bearing against the removable bottom 41 at its upper end, and carrying at its lower end a wheel 47 adapted to run upon a track 48. A pin 46 is set into the plunger 45 and projects through a slot formed in the tubular extension 44, so as to limit the movement of the plunger. A bracket 49 for each mold is also rigidly secured to the mold carrier 33 the purpose of which will be hereinafter explained.

Arranged under the die 32 on each side of the plunger 45 are supports for sustaining the thrust of the die press. One of these supports is clearly shown in Fig. 4, and comprises a pedestal 51, carrying at its upper end on each side thereof an anti-friction roller 50. The periphery of these rollers is flush with the upper surface of the pedestal so that the two coöperate to form a smooth support for the plate 42. The pedestal 51 is supported on a base 53 which rests upon the framework 1, and is preferably connected to such base by means of screws 52 so arranged that the height of the pedestal may be readily adjusted.

In order to feed the material from the mixer into the molds, I provide a distributer or feeder arranged at one side of the mixer, and comprising, as shown, an open cylindrical receptacle 55 having a bottom 56, provided with an opening $56^a$ which is adapted to register with the molds in the mold table as they are moved under the same. The material from the mixer 7 is discharged through an opening $7^a$ near the bottom thereof, and passes through a trough 54 into the receptacle 55. A sweep arm or stirrer 47 is arranged in the distributer 55 close to the bottom thereof, and is so disposed as to sweep over the opening $56^a$ and feed the material through the same. The sweep arm 57 is secured to the upper end of a shaft 58, supported at its lower end in a bearing 59, mounted on the framework 1, and driven from the shaft 2 by means of a sprocket chain 62, passing over sprocket wheels 60 and 61 on the shafts 58 and 2, respectively. Also secured to the upper end of the shaft 2 is an arm 63, to the outer end of which is pivoted a pawl 64, such pawl having at its upper end a cross bar 65, so that the lever as a whole is substantially of T-shape. This pawl is provided near its pivot with a lug $64^a$, which coöperates with a stop pin $64^b$ (see Fig. 13) in such a manner as to limit the downward movement of the cross bar 65. One end of the cross bar 65 is adapted to slide in a cam shaped slot formed of a pair of grooved rails 66, having downwardly inclined ends 67 and 68, as clearly shown in Fig. 13. Pivoted at 71 adjacent the end 67 of the cam slot is a lever 70, and adjacent the end 68 of the slot, is another lever 73. A link 72 connects the upper end of the lever 70 with the lower end of the lever 73, and the upper end of the lever 73 is arranged adjacent the cam slot so as to be engaged by one end of the cross bar 65 of the pawl 64. The lever 73 is secured to one end of a rock shaft 74 mounted in brackets 75, which rock shaft has secured to its other end a crank arm 76, which is connected by means of a link 77 to a vertically extending rod 79, supported in guides $79^a$ on a part $1^b$ of the framework. The link 77 is pivoted to the rod 79 near its middle point between the guides as indicated at 78. The rod 79 carries at its upper end a wedge-shaped head 80, which head is adapted to engage any one of a series of similarly shaped notches 81, formed in the edge of the mold table 33.

In order to properly compact and smooth the upper surface of the freshly molded articles, I mount just above the mold table a roller 83 and a plurality of smoothing blades 84, as clearly shown in Fig. 2. These blades and roller are supported at one end upon the platform 8, and at the other end upon an arc-shaped frame or beam 82. In order to dislodge from the bottom of the die and from these smoothing blades and roller, any material which may have adhered thereto, I provide a scraper comprising a blade 85, secured to a shaft 86, journaled in bearings 87 carried by the table 33, and preferably embedded therein so as to readily pass beneath the die. The shaft 86 carries at its outer end a crank arm 88, in the end of which is mounted a roller 89, which roller is adapted to engage a curved track 90 secured to the support 82, as by means of brackets 91. As clearly shown in Fig. 16, the track 90 is provided with a downwardly turned forward end 92 up which the roller 89 is adapted to ride as the mold table revolves, and lift the scraper plate into contact with the surface being cleaned. It will be understood, of course, that as shown in Fig. 2, one of these scrapers is provided for each mold that the table carries, so that the die and smoothing plates may be cleaned after each operation.

The machine as above described is particularly adapted for molding thin flat tiles and the like, such tiles being of the shape and size of the molds themselves. In order, however, to mold articles of any different shape or size it is simply necessary to insert in the molds 40 any one of the filler blocks such as shown in Figs. 6 to 12, inclusive.

In Fig. 7 is shown a mold having a block 40$^b$ inserted therein, so as to produce a tile or brick of smaller size and of greater thickness than that shown in Fig. 1, since the removable bottom 41 is omitted, and the material molded directly upon a plate 41$^b$. In this figure also it will be seen that a smaller die 32$^b$ is employed, to correspond with the size of the mold.

In Fig. 5 I have illustrated a slightly different form of press, the die 32$^a$, instead of being operated by means of a lever such as 26, being carried by an arm 26$^a$ rigidly secured to the up-and-down rod 25$^a$. In this figure also I have illustrated a mold with a filler block adapting it for use in the manufacture of brick, each mold space accommodating two bricks. In this arrangement the plunger 45$^a$ is bifurcated at its upper end, and carries two supports or movable bottoms 41$^a$, one for each brick, as clearly shown.

In the larger sizes of my machine, or in special classes of work, it may be, and frequently is, desirable to arrange two or more distributers or feeders, at different points around the mold table as indicated at 55$^a$ and 55$^b$ in Fig. 18. With this arrangement I also provide two or more separate presses, such as indicated at 30$^a$ and 30$^b$, and also, if desired, two or more cams 15 and arms 63, so that a number of distinct pressing operations may be produced by each revolution of the shaft 2. Also, of course, adjacent each press I provide smoothing rollers and blades and a support 82$^a$, 82$^b$ for each set. It will be apparent that with such an arrangement, the capacity of the machine may be doubled or trebled.

In operation, as the shaft 2 revolves, the arm 63 swings around continuously. When not in engagement with the cam guides 66 it will be understood that the pawl 64 remains in slightly inclined position with the lug 64$^a$ resting against the stop pin 64$^b$. In this position, the cross-bar 65 is supported so as to move in a plane level with the lower ends 67 and 68 of the cam guides 66. When, therefore, the bar 65 arrives at the end 67 of the cam guide, it enters the slot and slides along therein, being at the same time lifted by the slot up to the position shown in Fig. 13. As it passes the lever 70 it engages and rocks the same, and by means of the connections 72, 73, 76, 77 and 79, lifts the wedge-shaped head 80 out of the notch 81, and thus releases the mold table 33 and leaves it free to rotate. Upon further movement of the arm 63 and pawl 64, the inner end of the crossbar 65 engages the lower depending end of bracket 49, and by this means serves to push the table 33 around with the arm 63. When, however, the parts reach the position shown in Fig. 13, the outer end of cross bar 65 strikes the upper end of lever 73, and in so doing, rocks the shaft 74 and causes the bar 79 to descend, thus forcing the locking wedge 80 into one of the notches 81, and thereby arresting the movement of the mold table and locking it in position, so that one of the molds is brought directly under the die. At the same time, owing to the downward bend of the cam guides 66, the inner end of the cross bar 65 is carried free of the bracket 49, and thus disconnects the table from the driving means.

The press is operated by means of the cam 15, and the connections 16, 25, 26 and 30, and after the die has descended and risen again, one of the brackets 49 is again engaged by the pawl 64 as it swings around, and the table 33 moved forward again. As it moves forward, roller 47 rides up the cam track 48, and thus gradually lifts the molded article and removable bottom from the mold and carries them under the smoothing rollers and blades. As shown in Figs. 14 and 15 the track 48 is preferably formed from a plurality of strips 48, 48$^a$, 48$^b$, of successively increasing height, arranged in a chair 48$^c$, and held in position by a plate 48$^d$.

In connection with the cam 15 and associated parts it will be noted that I have provided two different methods for operating the die and plunger. If, for example, the roller 19 be removed, and the weights 23 also taken off, the spring 21 will hold the roller 20 up into snug engagement with the lower surface of the flange 14. With this arrangement the cam 15 will engage the roller 20 and positively force the plunger and die downward by means of the direct action of the cam. If, on the other hand, the roller 19 be left in place and the roller 20 removed, while also the weights 23 are allowed to remain, and the spring 21 disconnected, it will be observed that the plunger and die will be lifted by the cam action but the downward or working stroke will be produced by the gravity of the weights 23. By varying the number or position of the weights 23, it will thus be seen that the force with which the plunger is in this manner actuated can be varied at will.

It will thus be seen that I have provided a machine for rapidly and continuously molding articles of any desired shape and size, and in which a large number of novel and useful features are embodied, and it is thought that the numerous advantages of my invention will be readily appreciated by those skilled in the art.

What I claim is:—

1. In a molding machine, the combination with a movable die and means for reciprocating the same, of a rotary mold-table arranged in coöperative relation with said die, a continuously rotating arm disposed adjacent said table, a pawl pivoted to the end of said arm, brackets depending from said table, and a cam slot arranged to guide said pawl into engagement with one of said brackets, and, after the table has been moved thereby a predetermined distance, out of engagement therewith, and a locking device for the table operated by said pawl as it enters and leaves said cam slot.

2. In a molding machine, the combination with a die, and means for operating the same, of a rotary mold table arranged in coöperative relation with said die, a continuously rotating member disposed in proximity to said table and mounted concentrically therewith, means for causing said member to automatically engage and move said table a predetermined distance, and means extending into the path of movement of and actuated by said member for temporarily locking said table after each such movement.

3. In a molding machine, the combination with a die, and means for operating the same, of a rotary mold table disposed beneath said die and coöperating therewith, a bracket depending from said table, a rotating member concentrically arranged with respect to said table, means carried by said member for engaging said bracket, and a cam-guide for moving said last mentioned means into and out of engagement with said bracket.

4. In a molding machine, the combination with a die, and means for operating the same, of a mold-table disposed beneath said die, a shaft concentrically mounted with respect to said table, an arm carried by said shaft, a bracket depending from said table, a pawl pivoted to the end of said arm, said pawl moving normally in a plane below said bracket, and a cam-guide arranged adjacent the path of said pawl, and serving to lift the same into engagement with said bracket during a predetermined part of its movement.

5. In a molding machine, a rotary mold-table, molds carried thereby, a die press coöperating with one after another of said molds as the table is rotated, a smoothing roller and blade arranged above said table and adapted to smooth the upper surface of the freshly molded articles, and means for periodically scraping the waste material from said roller, blade, and die.

6. In a molding machine, a rotary mold-table, molds carried thereby, a die coöperating with one after another of said molds as the table is moved, a scraping blade pivotally mounted on the upper side of said table adjacent each mold, a crank-arm and roller carried by each scraper, and a cam-track arranged adjacent the die and on which said roller is adapted to run, whereby, after the die has pressed the material in the mold, the scraper blade is forced into contact with the under surface of said die, and moved thereacross, thereby cleaning the same of any adhering material.

In testimony whereof I affix my signature in presence of two witnesses.

JOHN B. LEAMON.

Witnesses:
L. W. PEEPLES,
CHAS. I. WOOD.